(12) United States Patent
Böhm et al.

(10) Patent No.: US 6,513,864 B2
(45) Date of Patent: Feb. 4, 2003

(54) MODULAR VEHICLE ROOF

(75) Inventors: Horst Böhm, Frankfurt (DE); Thomas Becher, Rodgau (DE); Rainer Grimm, Frankfurt (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 09/925,841

(22) Filed: Aug. 8, 2001

(65) Prior Publication Data
US 2002/0021029 A1 Feb. 21, 2002

(30) Foreign Application Priority Data
Aug. 8, 2000 (DE) .......................... 100 39 522

(51) Int. Cl.⁷ .................................. B00J 7/00
(52) U.S. Cl. ................... 296/214; 296/215; 160/370.22
(58) Field of Search ................. 296/214, 215, 296/219, 141, 143; 160/370.22, 270, 273.1, 266, 265, 268.1

(56) References Cited

U.S. PATENT DOCUMENTS

| | | | | |
|---|---|---|---|---|
| 4,811,985 A | * | 3/1989 | Kruger et al. | 296/214 |
| 5,005,899 A | * | 4/1991 | Clenet | 296/214 |
| 5,664,827 A | * | 9/1997 | Mori et al. | 296/214 X |
| 6,179,373 B1 | * | 1/2001 | Bohm et al. | 296/214 |
| 6,386,626 B1 | * | 5/2002 | Makino et al. | 296/214 |
| 2001/0003400 A1 | * | 6/2001 | Grimm et al. | 296/214 X |

* cited by examiner

*Primary Examiner*—Joseph D. Pape
(74) *Attorney, Agent, or Firm*—Carlson, Gaskey & Olds

(57) ABSTRACT

A vehicle roof module is proposed, consisting of a transparent roof skin, constituting the outer shell of a sandwich structure, and of an inner shell of the sandwich structure, the special feature thereof being that the inner shell is molded in the manner of a frame and is provided only in the edge area of the outer shell, thereby forming a panoramic transparent surface, a sun-blind being arranged beneath the transparent surface, which is held on the inner shell by elements foamed into the frame-type inner shell.

12 Claims, 2 Drawing Sheets

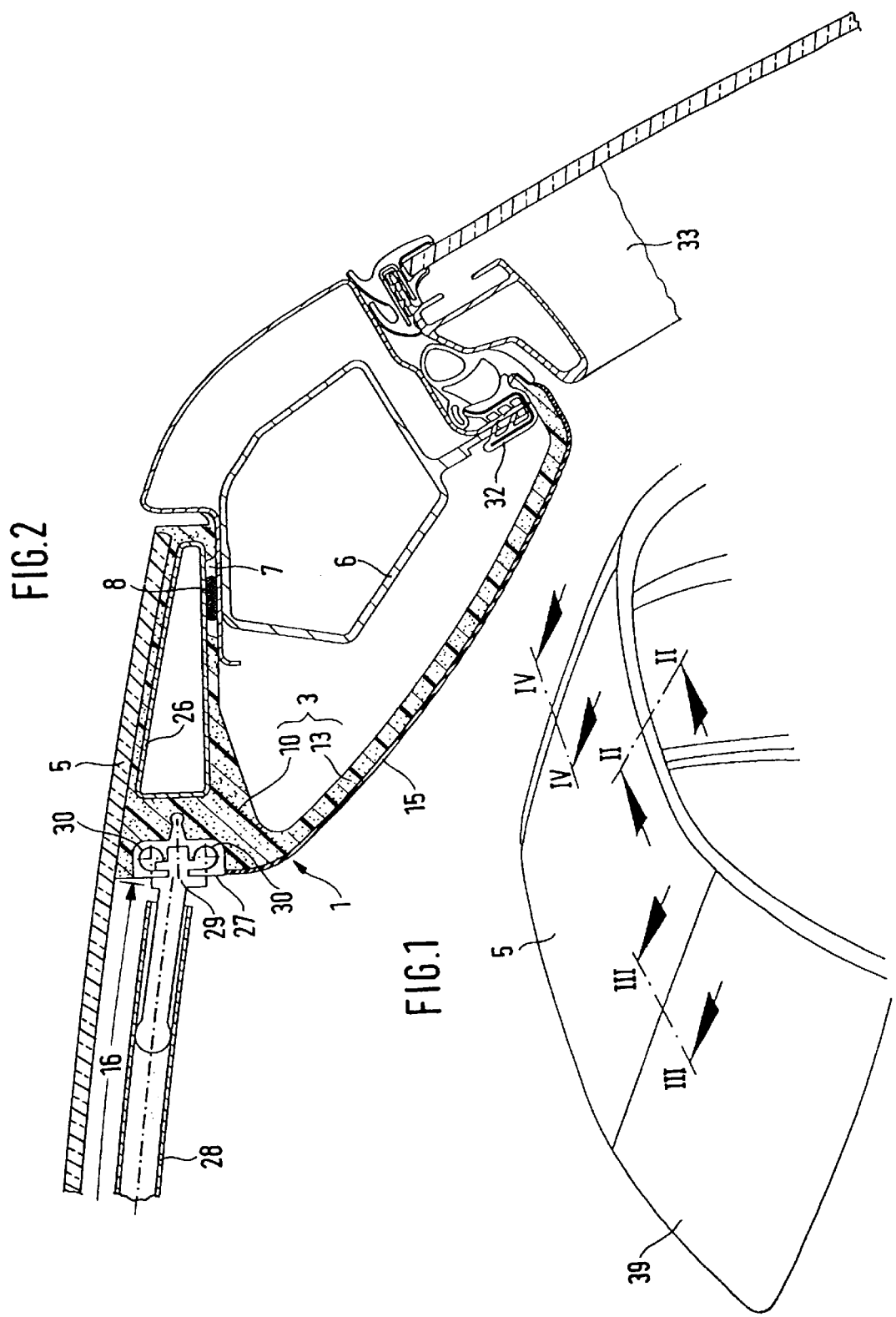

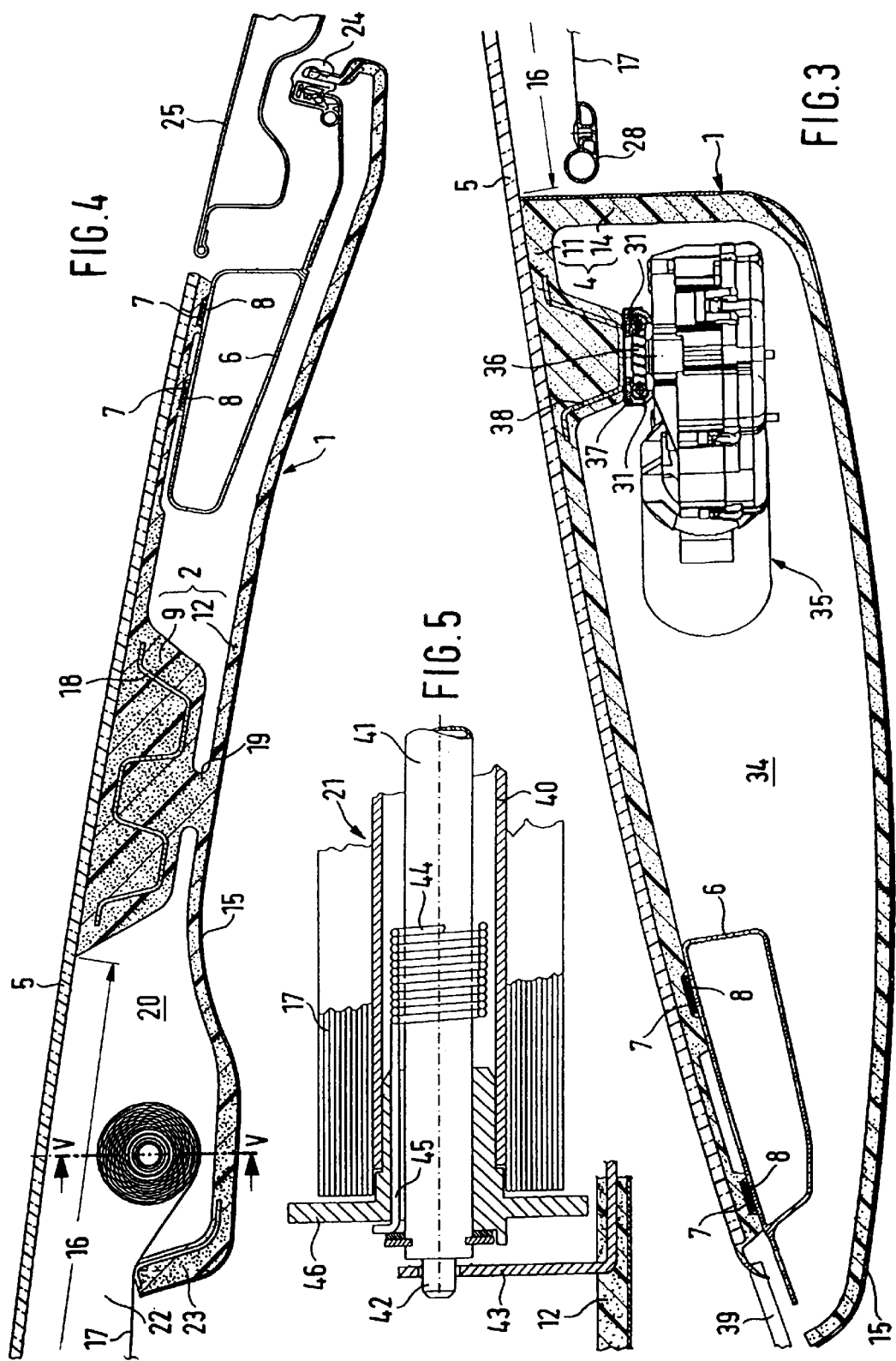

MODULAR VEHICLE ROOF

BRIEF DESCRIPTION OF THE PRIOR ART

The invention relates to a modular vehicle roof, designed in particular for motor vehicles.

Such a vehicle roof is known, which is of a sandwich-type construction consisting of a roof skin formed of glass or of a transparent plastics material as the outer shell and an inner shell connected firmly therewith and molded from foamed plastics material, is produced separately from the vehicle bodywork and may be positioned with its outer edges on a bodywork frame and connected firmly therewith.

Such modular prefabricated vehicle roofs ready for installation are completed separately from the vehicle bodywork and only connected to the vehicle bodywork on the assembly belt in the automobile factory. Owing in particular to the considerable reduction in assembly time on the assembly belt, such vehicle roof modules are becoming increasingly popular.

In one embodiment of a known vehicle roof (DE 197 09 016 A1), a preassembled sliding sunroof unit comprising, for example, a sliding cover in the form of a glass cover, is incorporated into the roof module. The glass cover has a transparent surface area which is predetermined by the cover dimensions and is thus only limited.

An object of the invention is to provide a prefabricated modular vehicle roof of the above-indicated construction, which does not have a sliding sunroof unit incorporated in it but which nonetheless allows a view which may be screened off if desired.

SUMMARY OF THE INVENTION

According to the present invention, there is provided a modular vehicle roof for an automobile, the roof being of a sandwich-type construction and consisting of a roof skin formed of a transparent material as an outer shell having an edge region and an inner shell connected firmly therewith and molded from foamed plastics material; wherein the inner shell is molded in the manner of a frame and is provided only in the edge region of the outer shell, thereby forming a panoramic transparent surface, and wherein at least one sun-blind is arranged beneath the transparent surface, which is held on the inner shell by means of elements foamed into the frame-type inner shell.

The modular vehicle roof proposed by the invention provides for the inner shell molded from foamed plastics to be molded in the manner of a frame and to be provided only in the edge area of the outer shell made totally of glass or a transparent plastics material, thereby forming a panoramic transparent surface. This construction results in a transparent surface of comparatively large dimensions, such as cannot be achieved with transparent sliding covers in a sliding sunroof design. By arranging a sun-blind beneath the panoramic transparent surface, which blind is held on the inner shell by means of elements foamed into the inner shell molded in the manner of a frame, the transparent surface may be completely or partially screened by the sun-blind, such that the vehicle interior may be prevented from being heated up undesirably by intense sunlight and people outside the vehicle may be prevented from looking in. By foaming all the elements supporting the sun-blind into the frame-type inner shell, simple, operative pre-assembly of the roof module is achieved.

The sun-blind may be wound onto a winding reel arranged in a cavity in the rear frame part of the frame-type inner shell and passes through a gap between the rear frame part and the outer shell. With this advantageous arrangement the winding reel is not visible from the vehicle interior.

In order to be able to achieve virtually complete coverage of the panoramic transparent surface, it is provided for the width of the sun-blind plus the movement gaps on either side to correspond to the width of the panoramic transparent surface, wherein the sun-blind may be unwound from the winding reel at least in accordance with the length of the panoramic transparent surface.

To guide the sun-blind, a guide rail can be foamed into each of the two lateral frame parts of the frame-type inner shell, the two guide rails being arranged facing one another and displaceably guiding a front crossbar, to which the front end of the sun-blind is attached. Displacements of the crossbar in the two lateral guide rails lead, depending on the direction of movement, to a reduction or an increase in the blind surface area and thus conversely to an increase or a reduction in the panoramic transparent surface area. This infinite adjustability allows adjustment of the amount of incident light as desired.

The above-described installation of lateral guide rails provides the advantageous possibility of fitting carriers at the two ends of the front crossbar, which carriers guide the crossbar displaceably in the two guide rails and on which there act threaded cables guided in a compressively rigid manner in the guide rails, which cables are deflected into the front frame part of the frame-type inner shell and there engage with the pinion of a drive device for displacement movements of the crossbar.

The drive device may be a conventional crank drive, but preferably the drive device comprises an electric geared motor for the pinion, which is arranged in a cavity in the front frame part of the frame-type inner shell. With this arrangement, the drive device is also incorporated into the frame-type inner shell in such a way as to be invisible from the vehicle interior.

BRIEF DESCRIPTION OF THE DRAWINGS

For a better understanding of the invention and to show how the same may be carried into effect, reference will now be made, by way of example, to the accompanying drawings, in which:

FIG. 1 is a schematic perspective view of a vehicle roof module already fitted on motor vehicle bodywork, FIG. 2 shows a broken-away section through a side area of the vehicle roof module along section line II—II of FIG. 1, FIG. 3 shows a broken-away section through the front area of the roof module along section line III—III of FIG. 1, FIG. 4 shows a broken-away section through the rear area of the roof module along section line IV—IV of FIG. 1 and FIG. 5 shows a broken-away axial section through the winding reel along section line V—V of FIG. 4.

DESCRIPTION OF THE PREFERRED EMBODIMENT

A frame-type inner shell 1 of the roof module is molded from a foamed plastics material and comprises a rear frame part 2, two mutually symmetrical lateral frame parts 3 and a front frame part 4. The inner shell 1 is foamed onto a so-called "roof skin" 5, which forms the outer shell of the roof module, so as to connect the two firmly in a sandwich structure. The frame parts 2, 3 and 4 are of differing constructions, as will be explained in more detail below.

However, a common feature of the four frame parts is that they are positioned on the frame parts of the bodywork frame 6 assigned thereto and connected firmly therewith. To this end, the frame parts 2 to 4 are provided with molded-in receiving grooves 7, in which there are accommodated adhesive beads 8 sealing the roof module relative to the bodywork frame 6 and simultaneously connecting the two.

In the exemplary embodiment illustrated, the frame parts 2 to 4 each consist of an upper frame element 9 (FIG. 4) or 10 (FIG. 2) or 11 (FIG. 3) facing the roof skin 5, which element rests on the bodywork frame 6, and of a lower frame element 12 (FIG. 4) or 13 (FIG. 2) or 14 (FIG. 3) connected firmly with the upper frame element, and molded in one piece therewith in the example shown. In the example illustrated, the lower frame elements 12 to 14 project beyond the outer edges of the roof skin 5 and may be bent downwards for passage through the bodywork opening defined by the bodywork frame 6 without lasting deformation and serve in these areas as a lining for the bodywork frame 6 to which they are suitably attached by their outer edges. Such an arrangement corresponds in principle to the modular roof known from DE 197 09 016 A1.

Suitable materials for the inner shell 1 are rigid PU-based foamed plastics, which may be reinforced by fibrous materials incorporated in the plastics prior to foaming, for example glass fiber sections. However, woven or knitted fabrics, nonwovens etc. inserted into the foaming mold are also suitable as reinforcements. All the contours of the inner shell 1 are formed by appropriate shaping of the foaming mold (not shown). The inner surfaces, i.e. the surfaces facing the vehicle interior, of the frame parts 2 to 4 of the inner shell 1 may be coated with a textile or film-type covering material 15 for decorative purposes.

The roof skin 5 consists throughout, right up to its edges, of glass or a suitable transparent plastics material and may be provided with a heat-insulating coating providing protection against excessive UV radiation. The frame-type inner shell 1 defines a panoramic transparent surface 16 covering the majority of the total roof area, as is indicated in FIGS. 2, 3 and 4 by dimension lines and extension lines. Beneath the panoramic transparent surface 16 there is arranged a sun-blind 17, which is held on the inner shell 1 by means of elements foamed into the frame-type inner shell 1 in a manner yet to be described.

The rear frame part 2 visible in FIG. 4 of the inner shell 1 is provided in its upper frame element 9 with a foamed-in strengthening profile 18, which is arranged in a thickened area of the upper frame element 9. The lower frame element 12 is connected to this thickened area via a connecting web 19, which lower frame element 12 extends forwards with one portion and rearwards with another portion to line the rear part of the bodywork frame 6. The forwardly extending portion forms a cavity 20, which is defined at the top by the roof skin 5 and to the rear by the upper frame element 9. The sun-blind 17 may be wound onto a winding reel 21 arranged in the cavity 20 and passes through a gap 22 between the lower frame element 9 of the rear frame part 2 and the outer shell 5. In so doing, the sun-blind 17 slides over a profile-reinforced lip 23 of the lower frame element 12. The portion of the lower frame element 12 extending to the rear is connected firmly to the bodywork frame 6 via a weather-strip 24. Above the weather-strip 24 and adjoining the roof skin 5 to the rear is located the broken-away window frame 25 of a vehicle boot.

The opposite side area, not shown, of the vehicle roof is a mirror image of the side area shown in FIG. 2. In the upper frame element 10 of the lateral frame part 3 there are located a foam-embedded hollow chamber profile 26 stiffening the frame-type inner shell 1 and thus the entire roof module, and a foamed-in guide rail 27. The two mutually facing guide rails 27, of which only one is shown in FIG. 2, guide a front crossbar 28 in displaceable manner, the front end of the sun-blind 17 being attached to said cross bar 28 (FIG. 3). Carriers 29 are attached to both ends of the front crossbar 28, which carriers 29 guide the crossbar 28 displaceably in the guide rails 27. The guide rails 27 each comprise two superposed guide channels 30, in which threaded cables 31 (FIG. 3) are guided in compressively rigid manner, as known per se from sliding sunroof drives. On the side of the sun-blind 17 shown in FIG. 2, one of the threaded cables 31 is connected firmly with the carrier 29, while, on the other side, not shown, of the sun-blind 17, the other threaded cable 31 is connected with the other carrier 29. As is conventional in the case of sliding sunroof drives, the threaded cables 31 perform contrary, synchronous displacement movements when driven simultaneously, as is the only option, and carry the front crossbar 28 forwards or backwards depending on the direction of drive by means of the carriers 29.

As is also clear from FIG. 2, the lower frame element 13 of the lateral frame part 3 of the inner shell 1 lines the bodywork frame 6 and is connected therewith via a weather-strip 32, which simultaneously forms an inner seal for the vehicle door 33, shown broken away.

The two threaded cables 31 guided in compressively rigid manner in the lateral guide rails 27, are deflected into the front frame part 4, illustrated in FIG. 3, of the inner shell 1 and there are guided in correspondingly compressively rigid manner displaceably in guide channels (not shown). The front frame part 4 contains a cavity 34 defined and closed at the top by the upper frame element 11 and at the bottom and to the rear by the lower frame element 14. In the front frame part 4, an electric geared motor 35 is arranged in the cavity 34, which engages with a pinion 36 with the two threaded cables 31 inside a drive housing 37. The electric geared motor 35 is connected firmly via the drive housing 37 with a stiffening profile 38, which is foamed into a thickened portion of the upper frame element 11. The lower frame element 14 extends forwards as far as for instance the windscreen 39, indicated by dash-dotted lines, and provides a lining for the bodywork frame 6, with which it is firmly connected via weather-strips or the like, not shown.

The winding reel 21 of the sun-blind 17 is illustrated in FIG. 5. The winding reel 21, onto which the webbing of the sun-blind may be wound, has a tubular winding body 40, which concentrically surrounds a bearing shaft 41. The bearing shaft 41 is provided on both sides (only one side is shown) with bearing journals 42, which are supported rotatably in pillow blocks 43. The pillow blocks 43 are foamed into the lower frame element 14 of the rear frame part 2 of the inner shell 1. A restoring spring 44 in the form of a helical torsion spring is located in the space between the winding body 40 and the bearing shaft 41 and is fixed with its illustrated end 45 in the winding reel 21 and fixed stationarily with its other (non-illustrated) end outside the winding reel 21. When the sun-blind 17 is unwound from the winding reel 21, the restoring spring 44 is tensioned. If the front crossbar 28 is displaced backwards by appropriate drive in the direction for opening the sun-blind, the sun-blind is automatically wound onto the winding reel 21 due to the tensioned restoring spring 44, wherein side flanges 46 attached to the winding body 40 ensure lateral guidance of the sun-blind 17. If the sun-blind 17 is closed totally or in part against the force of the restoring spring 44, the permanently active restoring spring 44 ensures the necessary tensioning of the blind webbing.

As is clear from FIG. 2 in conjunction with FIG. 3, the width of the sun-blind 17, which is represented in FIG. 2 by the length of the front crossbar 28, plus the movement gaps on either side, is such that it corresponds to the width of the panoramic transparent surface 16. The furthest extent to which the sun-blind 17 may be unwound from the winding reel 21 corresponds to the length of the panoramic transparent surface 16, as indicated in FIG. 3, in which the front crossbar 28 is located virtually at the front frame part 4 of the inner shell 1.

Instead of the above-described arrangement of a sun-blind to cover in full or in part the panoramic transparent surface, a plurality of sun-blinds may also be provided, which may be actuated or driven together or independently of one another. Instead of the above-described arrangement of the drive device in the front frame part of the frame-type inner shell, the drive device may also be arranged in the rear frame part.

In summary, therefore, a vehicle roof module is proposed, consisting of a transparent roof skin, constituting the outer shell of a sandwich structure, and of an inner shell of the sandwich structure, the special feature thereof being that the inner shell is molded in the manner of a frame and is provided only in the edge area of the outer shell, thereby forming a panoramic transparent surface, a sun-blind being arranged beneath the transparent surface, which is held on the inner shell by means of elements foamed into the frame-type inner shell.

We claim:
1. A modular vehicle roof assembly, comprising:
   a transparent material roof skin having an edge region surrounding a central region;
   a molded, foamed plastics material inner shell firmly connected with the edge region of the roof skin, the inner shell extending only along the edge region of the roof skin such that the central region of the roof skin is a transparent surface;
   at least one sun-blind that is adapted to be extended across an area corresponding to the transparent central region of the roof skin; and
   a blind supporting device at least partially supported within the foamed plastics material of the inner shell.

2. The assembly of claim 1, wherein the roof skin comprises a glass material.

3. The assembly of claim 1, wherein the roof skin comprises a transparent plastic material.

4. The assembly of claim 1, wherein the assembly is a self-supporting structure that is made separate from a remainder of a vehicle body and adapted to be secured to corresponding portions of the vehicle body.

5. The assembly of claim 1, wherein the inner shell includes at least one cavity and a winding reel supported in the cavity and wherein at least a portion of the sun-blind is wound onto the winding reel.

6. The assembly of claim 5, including a gap formed in the inner shell and positioned relative to the cavity such that corresponding portions of the blind extend through the gap as the blind is manipulated relative to the transparent surface of the roof skin.

7. The assembly of claim 6, wherein the sun-blind has a width that corresponds to a width of the transparent roof skin surface and wherein the sun-blind may be extended across an entire length of the transparent surface.

8. The assembly of claim 1, wherein the inner shell includes two lateral frame parts and including at least one guide rail element within the foamed material of each of the lateral frame parts, the guide rails facing each other in guiding the sun-blind as the sun-blind is moved relative to the transparent surface.

9. The assembly of claim 8, including a cross bar coupled with one end of the sun-blind, the cross bar being guided in the guide rails.

10. The assembly of claim 9, wherein the cross bar has two ends and a carrier at each one of the ends, the carriers being received in the guide rails and including a drive device coupled with the carriers to automatically move the sun-blind relative to the transparent surface.

11. The assembly of claim 10, wherein the drive device comprises an electric geared motor that is supported in a cavity within a portion of the inner shell.

12. The assembly of claim 11, wherein the drive device includes a pinion and threaded cables compressively, rigidly guided in the guide rails, the cables being associated with the pinion of the drive device and the carriers such that movement of the pinion causes responsive movement of the cables in movement of the cross bar and sun-blind relative to the transparent surface.

* * * * *

UNITED STATES PATENT AND TRADEMARK OFFICE
CERTIFICATE OF CORRECTION

PATENT NO.   : 6,513,864 B2
DATED        : February 4, 2003
INVENTOR(S)  : Bohm et al.

It is certified that error appears in the above-identified patent and that said Letters Patent is hereby corrected as shown below:

<u>Title page,</u>
The inventor Becher's city should be as follows: -- Rodgan --, so Item [75] reads:
-- [75]  Inventors: Horst Bohm, Frankfurt (DE); Thomas Becher, Rodgan (DE); Rainer Grimm, Frankfurt (DE) --

Signed and Sealed this

Twenty-fourth Day of June, 2003

JAMES E. ROGAN
*Director of the United States Patent and Trademark Office*